US006990082B1

(12) United States Patent
Zehavi et al.

(10) Patent No.: US 6,990,082 B1
(45) Date of Patent: *Jan. 24, 2006

(54) WIRELESS APPARATUS HAVING A TRANSCEIVER EQUIPPED TO SUPPORT MULTIPLE WIRELESS COMMUNICATION PROTOCOLS

(75) Inventors: Ephraim Zehavi, Haifa (IL); Ron Nevo, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/436,458

(22) Filed: Nov. 8, 1999

(51) Int. Cl.
*H04J 3/00* (2006.01)
(52) U.S. Cl. ...................... 370/280; 455/419
(58) Field of Classification Search ............... 370/280,
370/337, 314–318, 331–345, 463–466, 470,
370/480–487, 310–328, 506, 442, 351, 401,
370/522, 347, 277, 478, 434, 395, 445, 378,
370/353, 414; 455/419, 418, 422, 423–430,
455/234.1, 109, 250.1, 76, 14, 504, 463,
455/435.2, 438, 437, 522, 78.86, 266, 553.1,
455/552.1; 709/219–221, 246, 239, 224,
709/238; 701/213; 375/146–152, 308, 373,
375/347, 322, 346, 342, 260–278; 345/157,
345/184; 348/552
See application file for complete search history.

(56) References Cited

U.S. PATENT DOCUMENTS

| | | | | |
|---|---|---|---|---|
| 5,550,893 A | * | 8/1996 | Heidari ..................... 455/553.1 |
| 5,732,076 A | * | 3/1998 | Ketseoglou et al. ........ 370/347 |
| 5,754,542 A | * | 5/1998 | Ault et al. .................. 370/342 |
| 5,754,947 A |   | 5/1998 | Tanabe et al. |
| 5,771,449 A | * | 6/1998 | Blasing et al. .............. 455/422 |
| 5,852,405 A |   | 12/1998 | Yoneda et al. |
| 5,854,813 A | * | 12/1998 | Rottinghaus et al. ....... 375/308 |
| 5,875,186 A |   | 2/1999 | Belanger et al. |
| 5,881,369 A | * | 3/1999 | Dean et al. ..................... 455/78 |
| 5,890,051 A | * | 3/1999 | Schlang et al. ............... 455/76 |
| 6,081,697 A | * | 6/2000 | Haartsen ..................... 455/109 |
| 6,167,258 A | * | 12/2000 | Schmidt et al. ............. 455/419 |
| 6,351,526 B1 | * | 2/2002 | Shaffer et al. ......... 379/201.01 |

(Continued)

FOREIGN PATENT DOCUMENTS

EP          0 812 069          12/1997

(Continued)

*Primary Examiner*—Chi Pham
*Assistant Examiner*—Prenell Jones
(74) *Attorney, Agent, or Firm*—Blakely, Sokoloff, Taylor & Zafman LLP

(57) ABSTRACT

A wireless device is provided with a wireless transceiver having a joint signal transmit/receive section, and a number of signal up/down conversion sections to transmit and receive signals wirelessly in accordance with a first and a second protocol. The wireless device is further provided with a controller/signal processing section to control and perform, in a coordinated manner, the transmit and receive operations in accordance with the two protocols. In various embodiments, the wireless device is further provided with a processor programmed to implement a time sharing schedule to facilitate the coordinated control and performance of the transmit and receive operations. In some of these embodiments, the processor is further programmed to monitor the transmit and receive workloads of the two protocols and adaptively perform the coordinated control and signal processing, based at least in part on the observed workloads. In various embodiments, the protocols may be selected pairs of Bluetooth, 802.11, 802.11a, 802.11b, Home RF and the like. The wireless device may also be used as a master device or a gateway device of two wireless networks.

20 Claims, 9 Drawing Sheets

U.S. PATENT DOCUMENTS

| | | | |
|---|---|---|---|
| 6,356,563 B1 * | 3/2002 | Nicoll et al. | 370/466 |
| 6,366,622 B1 * | 4/2002 | Brown et al. | 375/322 |
| 6,433,739 B1 * | 8/2002 | Soliman | 342/387 |
| 6,501,942 B1 * | 12/2002 | Weissman et al. | 455/14 |
| 6,526,034 B1 * | 2/2003 | Gorsuch | 370/338 |
| 6,600,726 B1 * | 7/2003 | Nevo et al. | 370/278 |
| 6,654,783 B1 * | 11/2003 | Hubbard | 709/202 |

FOREIGN PATENT DOCUMENTS

| | | |
|---|---|---|
| WO | WO 99/16266 | 1/1999 |
| WO | WO 99/29126 | 10/1999 |

* cited by examiner

WIRELESS APPARATUS HAVING A TRANSCEIVER EQUIPPED TO SUPPORT MULTIPLE WIRELESS COMMUNICATION PROTOCOLS

BACKGROUND OF THE INVENTION

1. Field of the Invention

The present invention relates to the field of wireless communication. More specifically, the present invention relates to the problem of concurrent wireless communication with multiple communication partners subscribing to different wireless communication protocols.

2. Background Information

Advances in microprocessor and communication technology have led to the increase in popularlity of wireless communicaiton. Once confined to the privileged, wireless voice communication have become affordable and available to the masses. Today, various efforts are under way to apply wireless communication to replace attachment cables used for attaching peripheral devices, such as printers, scanners and the like, as well as networking cables used for connecting clients, servers and the like. A leading candidate to accomplish the former is commonly known to those skilled in the art as the Bluetooth technology or Bluetooth protocol. Examples of technology to accomplish the later include the different variants of the IEEE 802.11 Standard published by the Institute of Electrical and Electronic Engineers, 802.11 (Frequency Hoping and Direct Sequence), 802.11a, 802.11b as well as Home RF, also known as Shared Wireless Access Protocol (SWAP) to those skilled in the art.

A need has emerged in a number of applications that it is desirable for a devcie to be able to operate "concurrently" in multiple wirelss protocols. One such applications is having a notebook computer being able to communicate with peripheral devices such as a phone, a printer, a scanner and the like, in accordance with the Bluetooth protocol; and with other computing devices, such as other peer computers or servers, communication devices, such as modems or adapters, and networking devices, such as gateways, routers, switches and the like, in accordance with one of the 802.11 protocols or Home RF.

However, the need cannot be met by simply providing the device with multiple transmitters, one for each protocol. The reason is because if multiple ones of these transmitters were to transmit at the same time. The transmitters are going to interfere with each other, resulting in corruption and/or loss of data, as well as degradation in performance.

As will be described in more detail below, the present invention substantially address this need in a very efficient and low cost manner. This and other advantages of the present invention will be readily apparent from the description to follow.

SUMMARY OF THE INVENTION

A wireless device is provided with a wireless transceiver having a joint signal transmit/receive section to transmit and receive signals wirelessly in accordance with a first and a second protocol. In one embodiment, the wireless device is further provided with a first and second up/down conversion pair to correspondingly up and down convert the transmit and receive signals in accordance with the two protocols. In an alternate embodiment, the wireless device is provided with a first and second down conversion unit to correspondingly down convert the receive signals, and a shared up conversion section to up convert transmit signals, in accordance with the two protocols. In either case, the wireless device is further provided with a controller/signal processing section to control and perform, in a coordinated manner, the transmit and receive operations in accordance with the two protocols.

In various embodiments, the wireless device is further provided with a processor programmed to implement a time sharing schedule to facilitate the coordinated control and performance of the transmit and receive operations. In some of these embodiments, the processor is further programmed to monitor the transmit and receive workloads of the two protocols and adaptively perform the coordinated control and signal processing, based at least in part on the observed workloads.

In various embodiments, the protocols may be selected pairs of Bluetooth, 802.11, 802.11a, 802.11b, Home RF and the like. The wireless device may also be used as a master device or a gateway device of two wireless networks.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented using software terminology commonly employed by those skilled in the art to convey the substance of their work to others skilled in the art. As well understood by those skilled in the art, these software quantities take the form of electrical, magnetic, or optical signals capable of being stored, transferred, combined, and otherwise manipulated through mechanical and electrical components of a digital system; and the term digital system includes general purpose as well as special purpose processors, systems, and the like, that are standalone, adjunct or embedded.

Various operations will be described as multiple discrete steps performed in turn in a manner that is most helpful in understanding the present invention, however, the order of description should not be construed as to imply that these operations are necessarily order dependent, in particular, the order the steps are presented. Furthermore, the phrase "in one embodiment" will be used repeatedly, however the phrase does not necessarily refer to the same embodiment, although it may.

Figure 1:
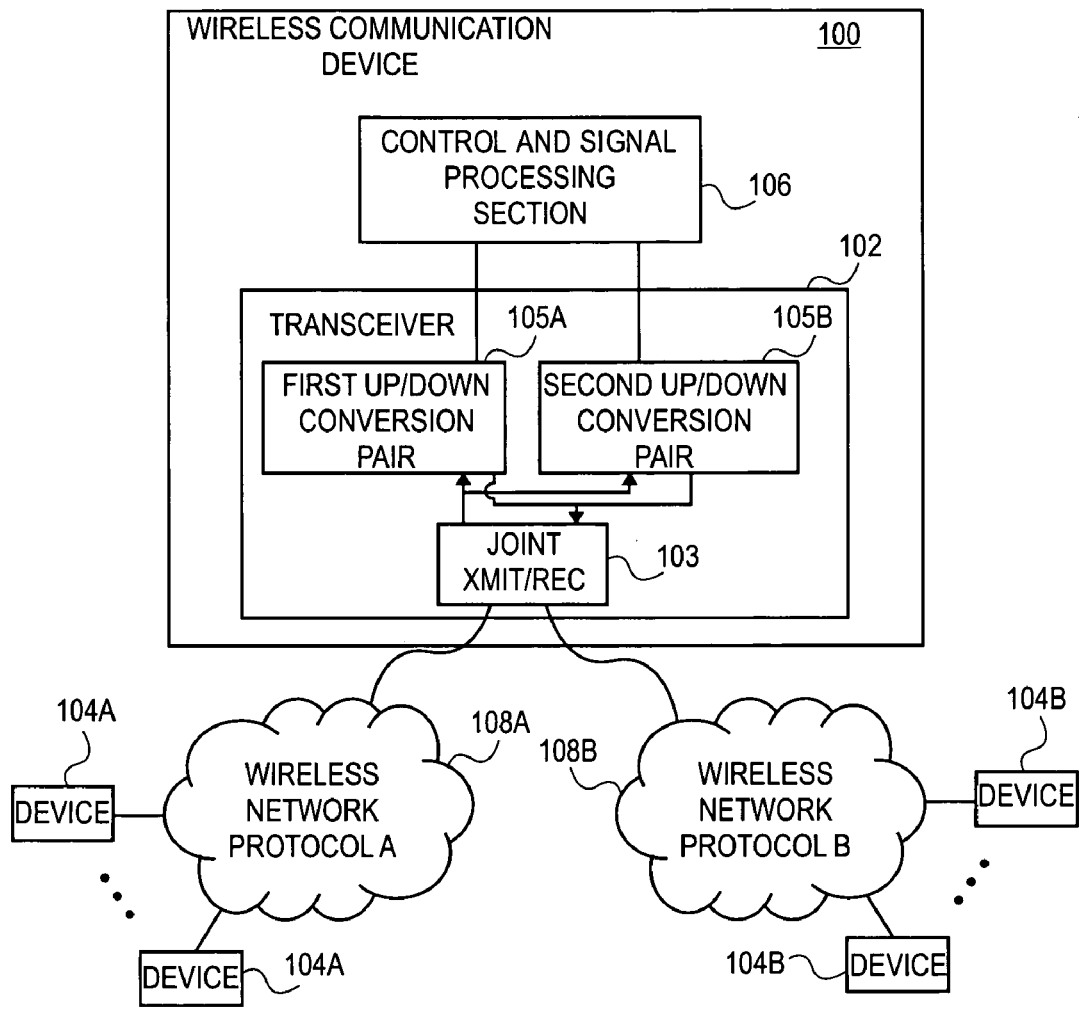
FIG. 1 illustrates an overview of the wireless device of the present invention, in accordance with one embodiment.

Referring now to FIG. 1, wherein an overview of the present invention in accordance with one embodiment is shown. As illustrated, wireless device 100 is provided with wireless transceiver 102 of the present invention to transmit and receive signals wirelessly in accordance with a first and a second wireless communication protocol, in a coordinated manner, to enable device 100 to communicate with devices 104a and devices 104b of wireless networks 108a and 108b, at substantially the same time. Wireless transceiver 102 includes joint signal transmit/receive section 103, and for the illustrated embodiment, a first and a second signal up/down conversion pairs 105a–105b sharing joint signal transmit/receive section 103. Wireless device 100 further includes controller/signal processing (C/SP) section 106 to process data for transmission by wireless transceiver 102, to process signals received by wireless transceiver 102, and to control the data/signal processing operations as well as the operation of wireless transceiver 102.

Figure 2:
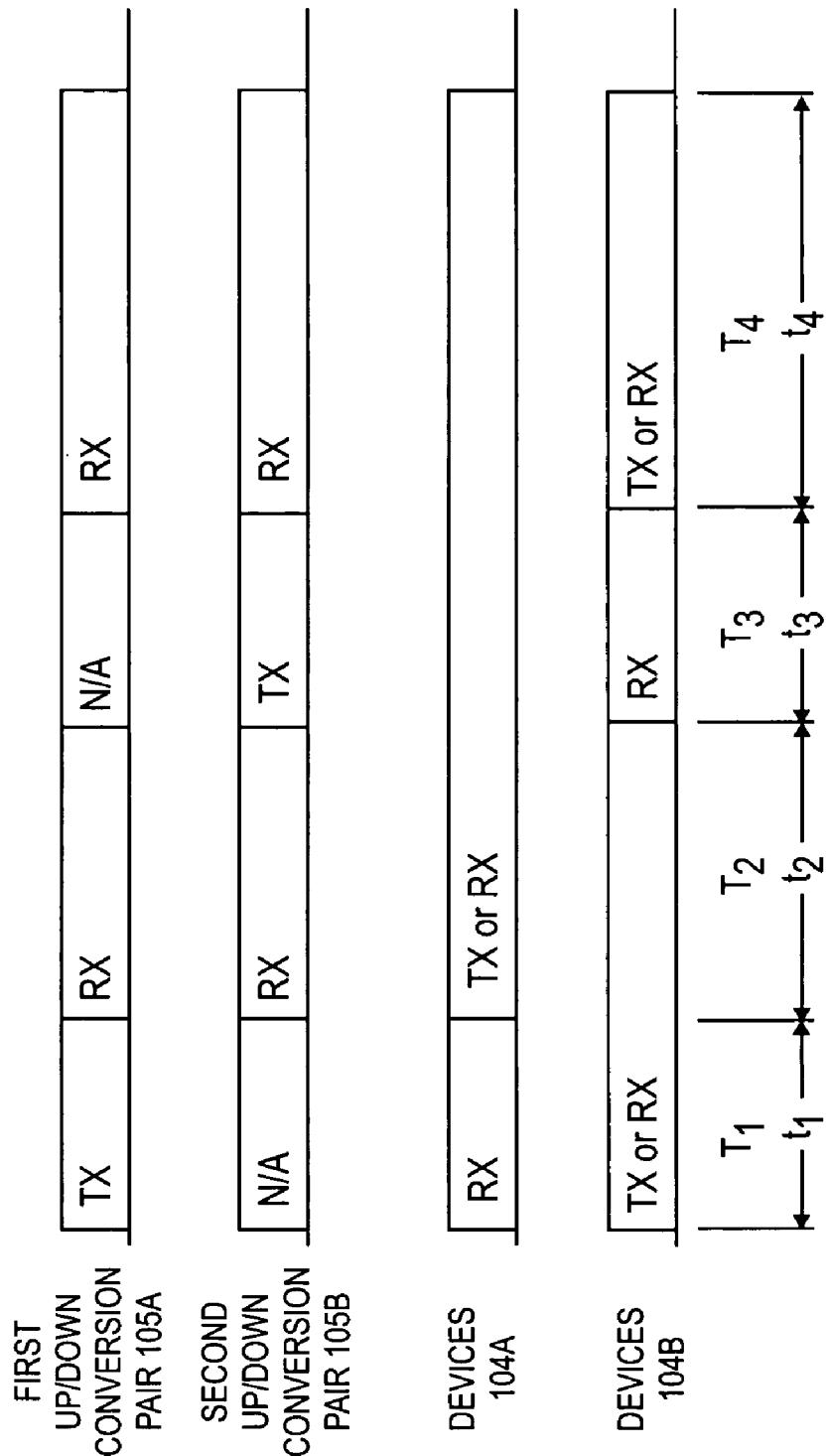
FIG. 2 illustrates a period of operation of the wireless device of the present invention, in accordance with one embodiment.

In one embodiment, C/SP section 106 controls the data/ signal processing operations and wireless transceiver 102 (hereinafter, simply transceiver), in a synchronized and coordinated fashion. More specifically, in this embodiment, C/SP section 106 controls the data/signal processing operations and transceiver 102 to alternate between transmits in a selected one of the two wireless communication protocols, and receives in both protocols. FIG. 2 illustrates a period of operation in accordance with this embodiment. As shown, in time period T1, for duration t1, C/SP section 106 operates joint signal transmit/receive section 103 and signal up/down conversion pairs 105a–105b to perform transmit of signals to devices 104a of wireless network 108a (hereinafter, simply network) in accordance with the first wireless communication protocol (hereinafter, simply protocol), at the exclusion of devices 104b of network 108b. During this period, C/SP section 106 also temporarily suspends processing of signals output from the signal down conversion sections of signal up/down conversion pairs 105a–105b. In time period T3, for duration t3, the operation is performed for the second protocol. That is, C/SP section 106 operates joint signal transmit/receive section 103 and signal up/down conversion pairs 105a–105b to perform transmit of signals to devices 104b of network 108b in accordance with the second protocol, at the exclusion of devices 104a of network 108a; and in like manner, temporarily suspends processing of signals output from the signal down conversion sections of signal up/down conversion pairs 105a–105b. In time periods T2 and T4, for duration t2 and t4 respectively, C/SP section 106 processes signals output by the down conversion sections of both signal up/down conversion pairs 105a–105b to receive signals from devices 104a and 104b of networks 108a and 108b in accordance with the respective protocols. During these time periods, C/SP section 106 temporarily suspends transmissions of signals to devices 104a as well as devices 104b of networks 108a and 108b.

Since all wireless protocols operate on either a carrier sense or contention free protocol, devices 104a are able to receive in time period T1, and transmit when there are packets to transmit, but otherwise receive, in time periods T2–T4. Likewise, devices 104b are able to receive in time period T3, and transmit when there are packets to transmit, but otherwise receive, in time periods T1–T2 and T4.

Accordingly, wireless device 100 is able to operate with devices 104a and 104b of networks 108a and 108b in two wireless protocols at the same time.

Note that time periods T1–T4 may or may not be equal in duration. That is, numerically t1–t4 may or may not be equal. As will be described in more detail below, in different variants of this embodiment, duration t1–t4 of time periods T1–T4 are dynamically and adaptively set. In particular, in some variants, duration t1–t4 of time periods T1–T4 are adaptively set based at least in part of transmit and receive workloads of networks 108a and 108b.

Referring back to FIG. 1, except for the teachings of the present invention incorporated in wireless device 100 to effectuate the above described coordinated manner of operation of C/SP section 106, joint signal transmit/receive section 103 and signal up/down conversion pairs 105a–105b of transceiver 102, C/SP section 106, joint signal transmit/ receive section 103 and signal up/down conversion pairs 105a–105b of transceiver 102 are otherwise intended to represent a broad range of these elements known in the art. Accordingly, except for the teachings of the present invention, which will be further described below, transceiver 102 and C/SP section 106 will not be otherwise further described.

Wireless device 100 is intended to represent a wide range of devices that can benefit from having the ability to wirelessly operate with other wireless devices in two or more wireless communication protocols at the same time. Examples of device 100 include but not limited to computers of various form factors, such as desktop, notebook, palm size and so forth, controller devices (i.e. master devices) to manage and control the operation of networks 108a and 108b, and gateway devices to facilitate communication between devices 104a and devices 104b.

Likewise, devices 104a and 104b are intended to represent a broad range of devices that can benefit from being able to communicate wirelessly. Examples of devices 104a include but not limited to phones, video cameras, speakers, modems, printers and scanners equipped to wireless communicate in accordance with the Bluetooth protocol. Examples of devices 104b include clients and servers, as well as gateways, modems, hubs, routers, and switches equipped to wireless communicate in accordance with a selected variant of the IEEE 802.11 protocols or Home RF. In these example embodiments, joint signal transmit/receive section 103 is a joint RF transmit/receive section, and each signal up/down conversion pair 105a/105b is an IF up/down conversion pair.

For ease of understanding, only two groups of devices 104a and 104b communicating in accordance with the first and second wireless communication protocols (supported by two up/down conversion sections 105a–105b in transceiver 102) are shown in FIG. 1. However, from the description to follow, it will be readily apparent to those skilled in the art, the present invention may be practiced with more than two protocols, with employment of additional signal up/down conversion sections for the additional protocols, as long as they are likewise coordinated.

Figure 3:
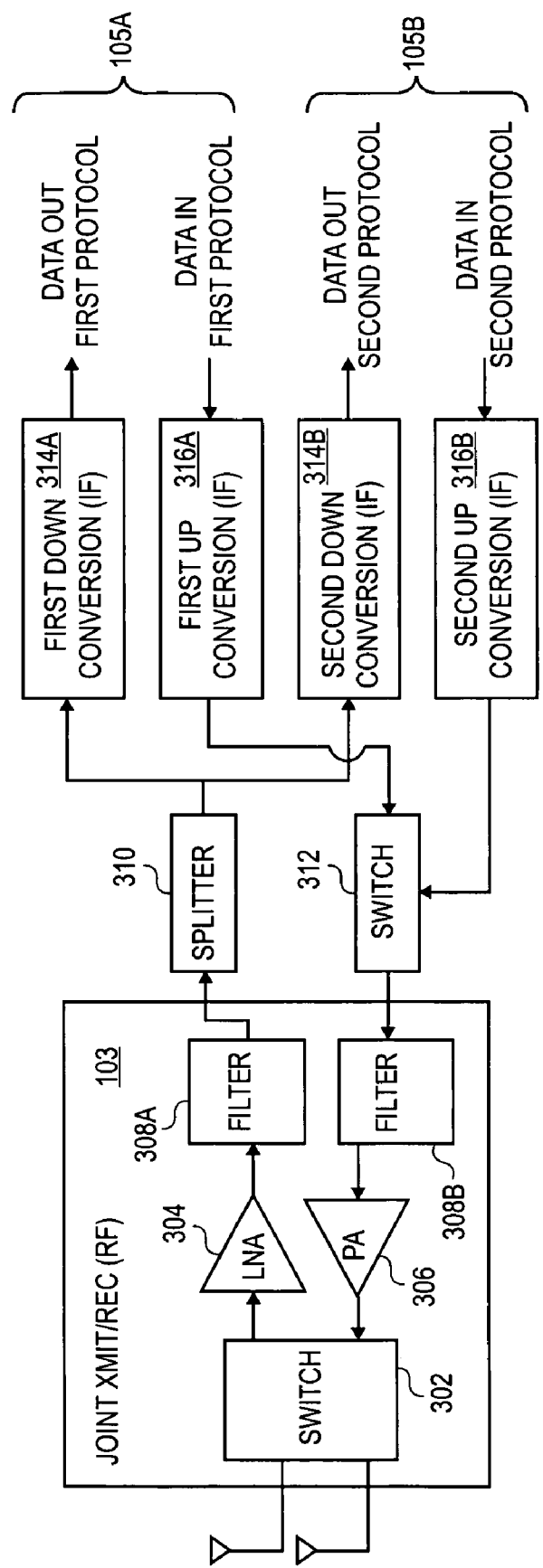
FIG. 3 illustrates the transceiver of the wireless device of FIG. 1 in further detail, in accordance with one implementation.

Referring now to FIG. 3, wherein transceiver 102 is illustrated in further detail, in accordance with one implementation. As described earlier, transceiver 102 includes joint signal transmit/receive section 103, and first and second signal up/down conversion pairs 105a–105b sharing joint signal transmit/receive section 103. As illustrated and alluded to earlier, joint signal transmit/receive section 103 is similarly constituted as prior art transmit/receive sections, with switch 302, low noise amplifier (LNA) 304, power amplifier (PA) 306 and filters 308a–308b coupled to each other as shown. The functions and constitutions of these elements are known in the art. Each signal up/down conversion section 105a/105b is also similarly constituted as in the prior art, with a signal up conversion subsection 316a/316b and a signal down conversion subsection 314a/314b for up and down conversion of signals of different frequencies of interest. Similarly, the functions and constitutions of these up and down conversion subsections are also known in the art. In one embodiment, joint transmit/receive section 103 is the earlier mentioned joint RF transmit/receive section that operates in a radio frequency, whereas first and second signal up/down conversion pairs 105a/105b are the earlier mentioned IF up/down conversion pairs that operate in intermediate frequencies.

In accordance with the present invention, down conversion subsections 314a–314b of up/down conversion pairs 105a–105b are coupled to joint signal transmit/receive section 103 in parallel, via splitter 310. That is, receive signals output by filter 308a are provided to both down conversion subsections 314a–314b for down conversions in their respective frequencies of interest, allowing receive signals transmitted in different frequencies or protocols to be received at the same time. In the case of up conversion subsections 316a–316b of up/down conversion pairs 105a–105b, they are selectively coupled to joint signal transmit/receive section 103, via switch 312. That is, transmit signals from up conversion subsections 314a–314b operating in their respective frequencies are selectively provided to filter 308b to filter, in preparation for transmission, at the exclusion of the other, resulting in only signals from one frequency of interest (or protocol) being transmitted at any one point in time.

Figure 4:
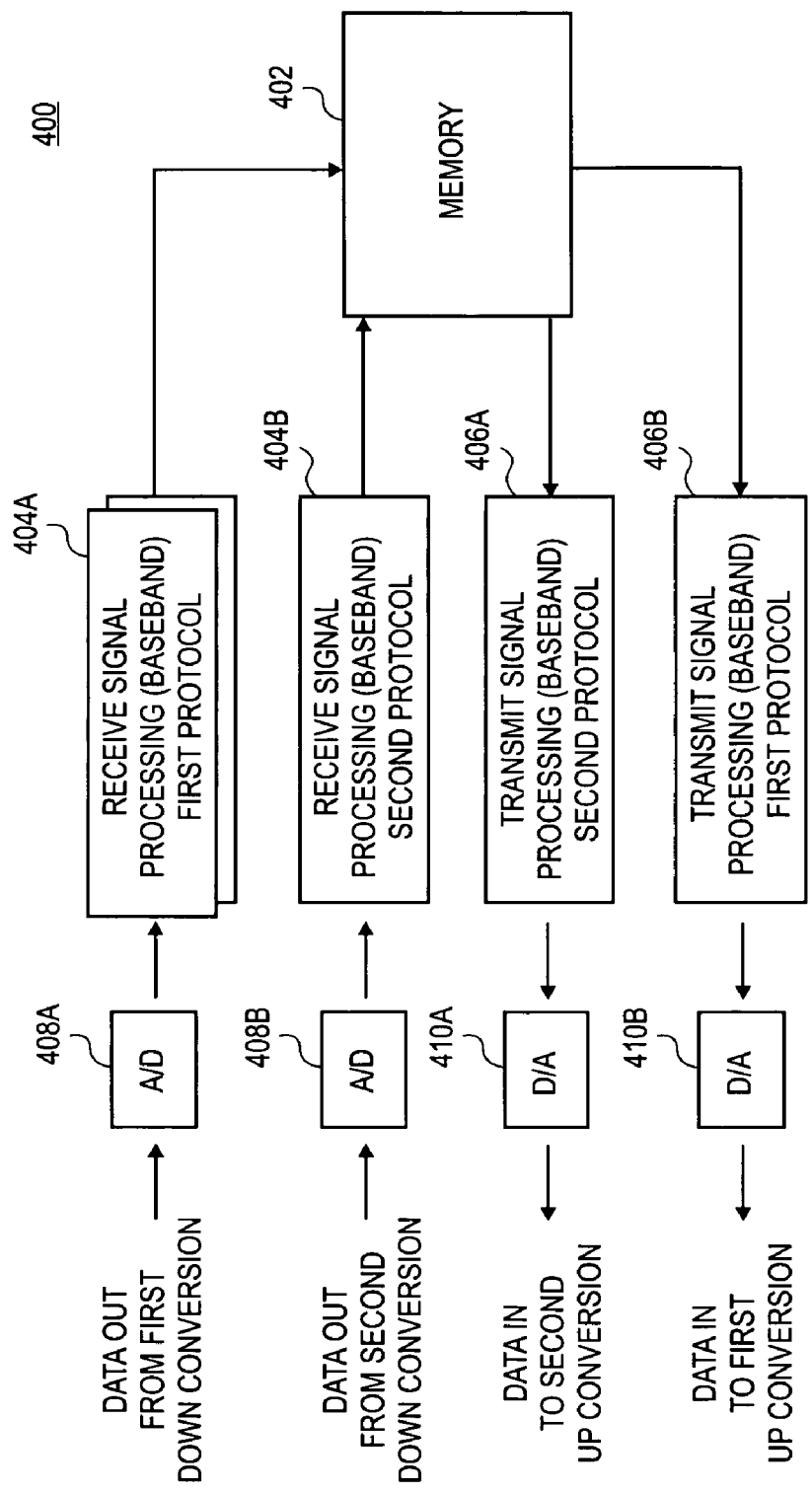
FIG. 4 illustrates the signal processing subsection of controller/signal processing section of the wireless device of FIG. 1 in further detail, in accordance with one implementation.

Referring now to FIG. 4, wherein the signal processing subsection of C/SP section 106 is illustrated in further detail, in accordance with one implementation. As illustrated, signal processing subsection 402 of C/SP section 106 includes memory 402, first and second receive signal processing blocks 404a–404b for first and second protocols, first and second transmit data processing blocks 406a–406b for first and second protocols, and A/D as well as D/A converters 408a–408b and 410a–410b. These elements perform their conventional functions known in the art, and their constitutions are protocol dependent, that is depending on the protocol they are designed/configured to support, e.g. an 802.11 variant or Bluetooth and so forth. A/D and D/A converters 408a–408b and 410a–410b convert analog signals into digital signals, and digital signals to analog signals respectively. First and second receive signal processing blocks 404a–404b process the digitized receive signals in accordance with their respective protocols to extract receive data, and store the extracted receive data in memory 402. First and second transmit data processing blocks 406a–406b process transmit data stored in memory 402 and package them for conversion and then transmission in accordance with first and second protocols respectively (e.g. adding headers, check sums and so forth). Except for the manner they are advantageously used to effectuate the substantially simultaneous communication with wireless devices in two protocols, these elements are otherwise known in the art. In one embodiment, receive and transmit signal processing blocks 404a and 406a process receive signals and package transmit data in accordance with a selected one of IEEE 802.11, 802.11a and 802.11b, and the Home RF protocol, whereas receive and transmit signal processing blocks 404b and 406b process receive signals and package transmit data in accordance with the Bluetooth protocol.

In an alternate embodiment, support for a selected one of IEEE 802.11, 802.11a and 802.11b, and the Home RF protocol may be dynamically selected. In this embodiment, multiple ones of receive and transmit signal processing blocks 404a and 406a are provided, and coupled to A/D and D/A converters 408a and 410a via a switching matrix.

Figure 5A:
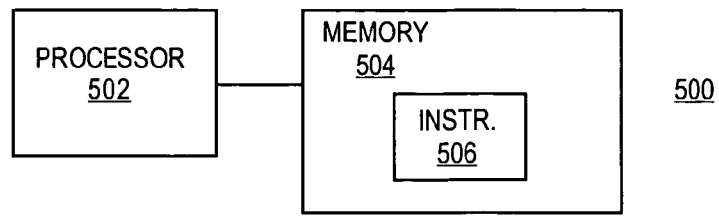
FIGS. 5a–5c illustrate the controller subsection of the controller/signal processing section of FIG. 1 in further detail, in accordance with one implementation.
Figure 5B:
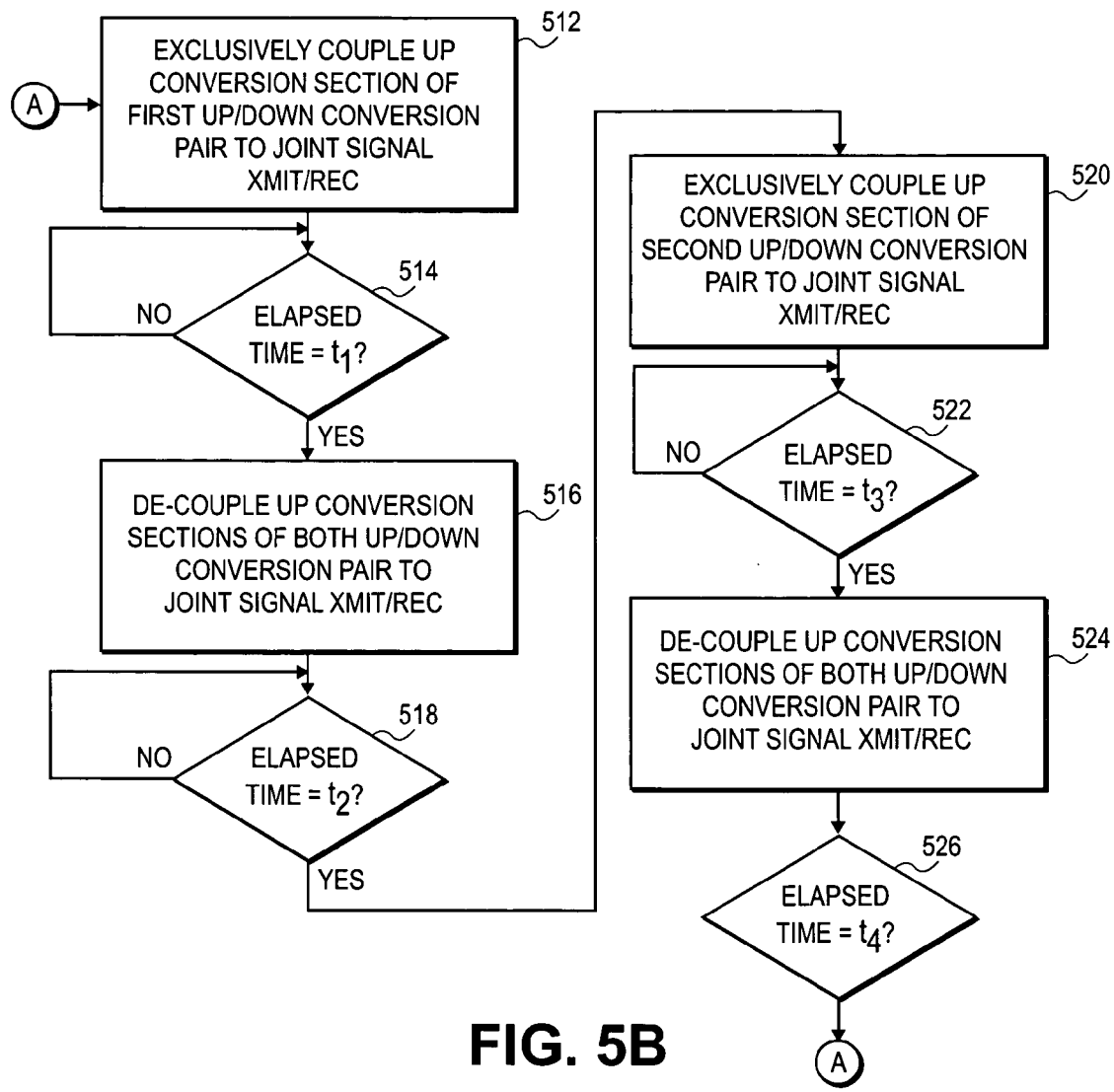
Figure 5C:
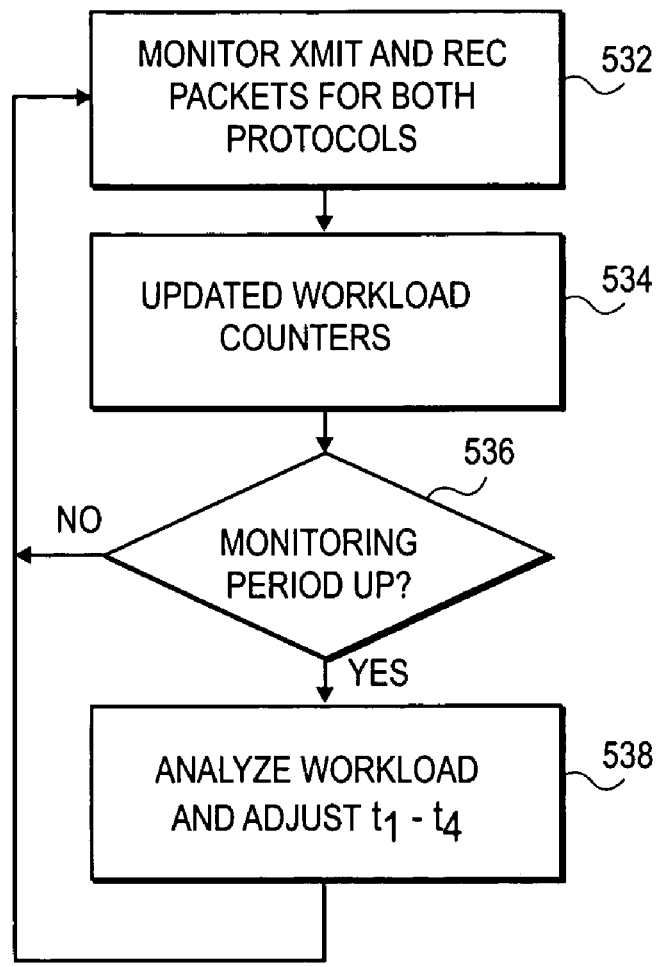

Referring now to FIGS. 5a–5c, wherein controller subsection 500 of C/SP section 106 is illustrated in further detail, in accordance with one implementation. As illustrated in FIG. 5a, controller subsection 500 includes processor 502 and memory 504. Stored in memory 504 are programming instructions 506 to be executed by processor 502 to effectuate the earlier describe control of the receive and transmit processing operations of the signal processing subsection of C/SP section 106 and transceiver 102 for the time sharing mode of operation as set forth referencing FIG. 2.

As illustrated in FIG. 5b, at 512, processor 502 (executing programming instructions 506) causes signal up conversion subsection 314a of first signal up/down conversion pair 105a to be coupled to joint signal transmit/receive section 103 at the exclusion of signal up conversion subsection 314b of first signal up/down conversion pair 105b. At the same time, processor 502 causes receive signal processing blocks 404a and 404b to temporarily ignore or suspend processing signals output by down conversion subsections 314a–314b. At 514, processor 502 repeatedly determines if it has operated in this mode for a sufficient duration, i.e. if elapsed time for period T1 has reached t1. Eventually, upon determining it has operated in this mode for the appropriate duration, the process continues at 516.

At 516, processor 502 causes signal up conversion subsections 314a–314b of both first and second signal up/down conversion pairs 105a–105b to be de-coupled from joint signal transmit/receive section 103, thereby preventing signals to be transmitted under either protocol. Furthermore, processor 502 causes receive signal processing blocks 404a and 404b to resume processing signals output by down conversion subsections 314a–314b, thereby allowing signals received in both protocols to be processed and received at the same time. At 518, processor 502 repeatedly determines if it has operated in this mode for a sufficient duration, i.e. if elapsed time for period T2 has reached t2. Eventually, upon determining it has operated in this mode for the appropriate duration, the process continues at 520.

At 520, processor 502 causes signal up conversion subsection 314b of second signal up/down conversion pair 105b to be coupled to joint signal transmit/receive section 103 at the exclusion of signal up conversion subsection 314a of first signal up/down conversion pair 105a. At the same time, processor 502 causes receive signal processing blocks 404a and 404b to temporarily ignore or suspend processing signals output by down conversion subsections 314a–314b. At 522, processor 502 repeatedly determines if it has operated in this mode for a sufficient duration, i.e. if elapsed time for period T3 has reached t3. Eventually, upon determining it has operated in this mode for the appropriate duration, the process continues at 524 and 526.

At 524 and 526 processor performs the same functions as earlier described for 516 and 518. Eventually, upon determining it has operated in this mode for period T4 for time t4, the process continues at 512.

Referring back to FIG. 5a, for the illustrated embodiment, memory 504 is also used to store the duration values t1–t4, allowing the length of periods T1–T4 to be programmable. Furthermore, as described in below and illustrated in FIG. 5c, programming instructions 506 are also equipped to adaptively adjusted these values. Referring now to FIG. 5c, at 532–534, processor monitors for transmit and receive packets of each protocol, and upon detection, updates two workload counters, one for each of the protocols, accordingly. At 536, processor determines if the period for monitoring has elapsed. The period may be pre-programmed or provided through e.g. a programmable configuration register (not shown). Operations 532–534 are repeated until the monitoring period has expired. At such time, the process continues at 538, where processor 502 analyzes the cumulated workload data for the two protocols, and adaptively adjusted the duration values t1–t4 for periods T1–T4, based at least in part on the observed workloads for the two protocols. The adjustment may be made in a straight forward proportional manner, or employing any one of a number of heuristic approaches.

Upon making the adjustment, in one embodiment, processor 502 resumes the monitoring immediately. In an alternate embodiment, processor 502 resumes the monitoring after waiting a pre-determined or dynamically determined period of time. Alternatively, it may also resume only upon invoked to do so.

Figure 6:
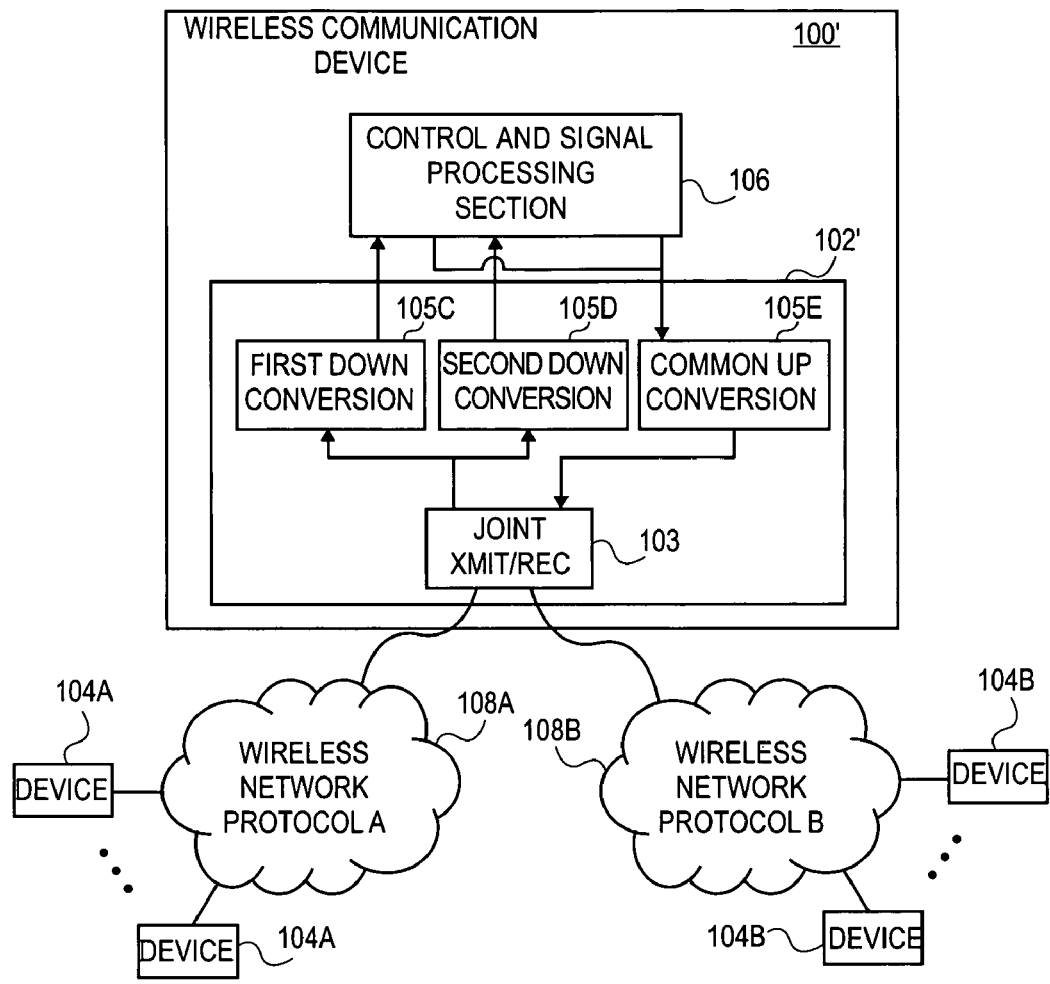
FIG. 6 illustrates an overview of the present invention, in accordance with another embodiment.

Referring now to FIG. 6, wherein an overview of the present invention in accordance with an alterante embodiment is shown. As illustrated, similar to the embodiment earlier described referencing FIG. 1, wireless device 100' is provided with wireless transceiver 102' of the present invention to transmit and receive signals wirelessly in accordance with a first and a second wireless communication protocol, in a coordinated manner, to enable device 100' to communicate with devices 104a and devices 104b of wireless networks 108a and 108b, at substantially the same time. Similar to the embodiment of FIG. 1, wireless transceiver 102' includes joint signal transmit/receive section 103. However, unlike the embodiment of FIG. 1, wireless device 100' is provided with a first and a second signal down conversion section 105c–105d and a common signal up conversion unit 105e, sharing joint signal transmit/receive section 103. Wireless device 100', as the embodiment of FIG. 1, further includes controller/signal processing (C/SP) section 106 to process data for transmission by wireless transceiver 102', to process signals received by wireless transceiver 102', and to control the data/signal processing operations as well as the operation of wireless transceiver 102'. In one embodiment, C/SP section 106 controls the data/signal processing operations and wireless transceiver 102', in a synchronized and coordinated fashion, as described earlier.

Figure 7:
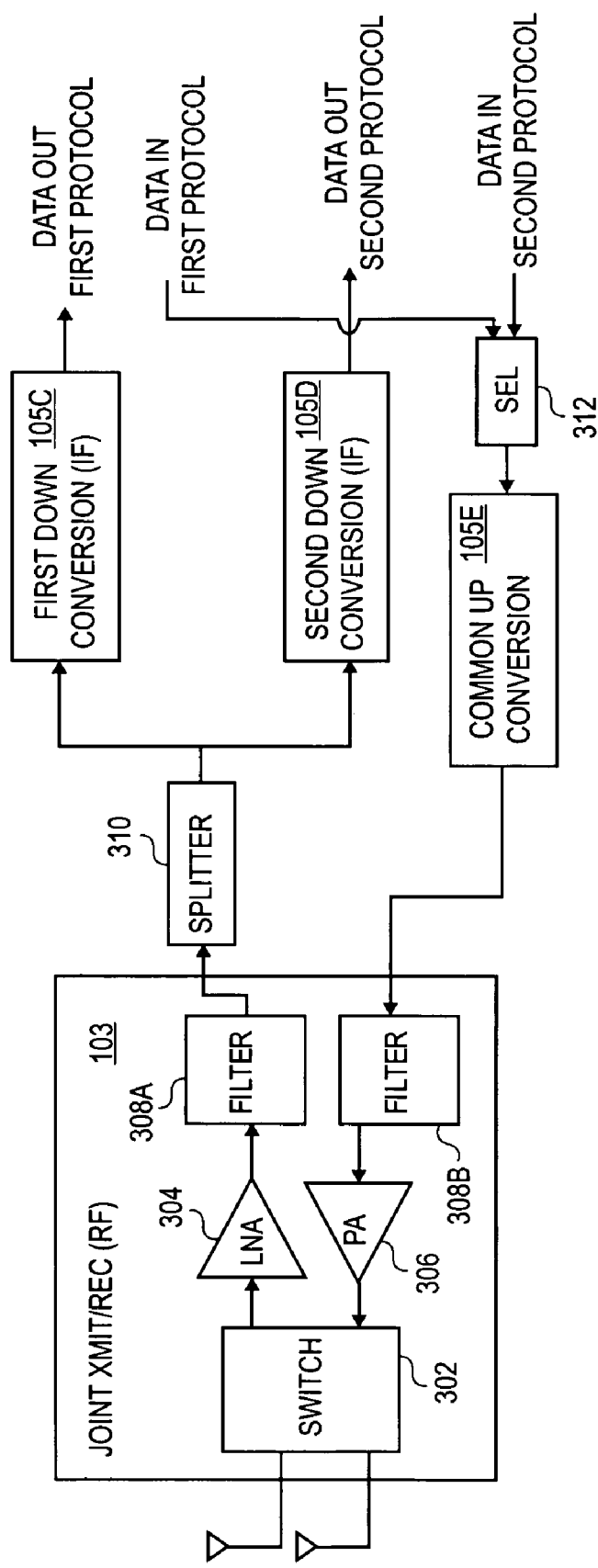
FIG. 7 illustrates the transceiver of the wireless device of FIG. 6 in further detail, in accordance with one implementation.

FIG. 7 illustrates transceiver 102' in further detail, in accordance with one implementation. Joint signal transmit/receive section 103 is similarly constituted as earlier described. Each signal down conversion section 105c/105d is also similarly constituted as in the prior art, and functions as earlier described signal down conversion subsection 314a/314b. Common signal up conversion section 105e serves the functions of both signal up conversion subsections 316a and 316b.

As earlier described, down conversion sections 150c–105d are coupled to joint signal transmit/receive section 103 in parallel, via splitter 310. That is, receive signals output by filter 308a are provided to both down conversion sections 105c–105d for down conversions in their respective frequencies of interest, allowing receive signals transmitted in different frequencies or protocols to be received at the same time. In the case of common up conversion sections 105e, it is selectively coupled to the transmit signal processing sections of C/SP 106, via switch 312. That is, transmit signals of the two protocols are provided to filter 308b through up conversion section 105e operating in one of two frequencies, at the exclusion of the other, for preparation for transmission, resulting in only signals from one frequency of interest (or protocol) being transmitted at any one point in time.

Figure 8:
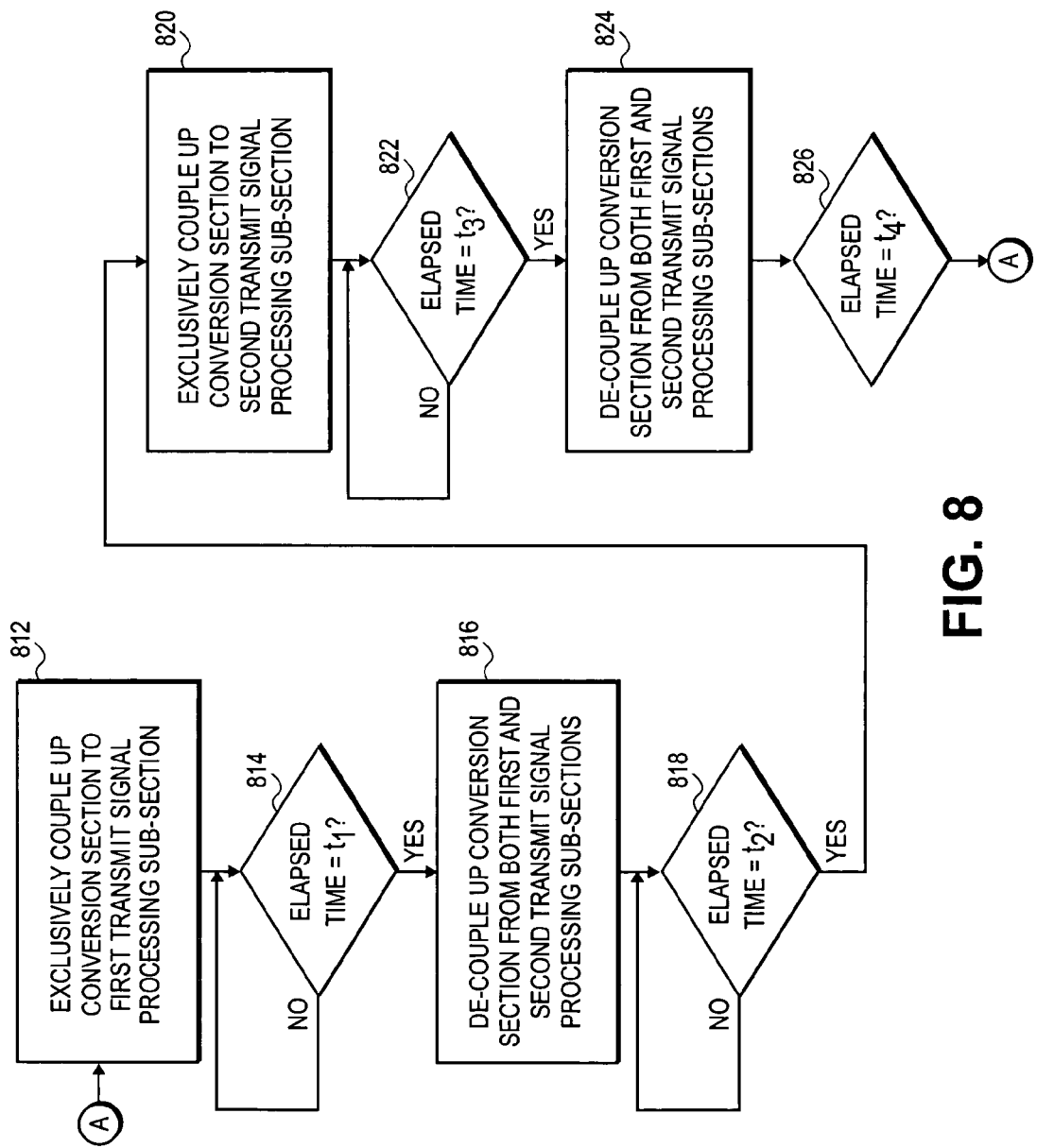
FIG. 8 illustrates the controller subsection of the controller/signal processing section of FIG. 6 in further detail, in accordance with one implementation.

C/SP 106 is similarly constituted as earlier described referencing FIG. 4, including controller subsection 500, which is constituted as earlier described referencing FIG. 5a. However, the operational flow of controller subsection 500 under this alternate embodiment is slightly different, which is illustrated in FIG. 8.

At 812, processor 502 (executing programming instructions 506) causes signal up conversion section 105e to be coupled to transmit signal processing subsection 406b of signal processing section 400 (for the first protocol), at the exclusion of transmit signal processing subsection 406a (for the second protocol). At the same time, processor 502 causes receive signal processing blocks 404a and 404b to temporarily ignore or suspend processing signals output by down conversion subsections 105c–105d. At 814, processor 502 repeatedly determines if it has operated in this mode for a sufficient duration, i.e. if elapsed time for period T1 has reached t1. Eventually, upon determining it has operated in this mode for the appropriate duration, the process continues at 816.

At 816, processor 502 causes signal up conversion section 105e to be de-coupled from both transmit signal processing subsections 406a and 406b of signal processing section 400, thereby preventing signals to be transmitted under either protocol. Furthermore, processor 502 causes receive signal processing blocks 404a and 404b to resume processing signals output by down conversion sections 105c–105d, thereby allowing signals received in both protocols to be processed and received at the same time. At 818, processor 502 repeatedly determines if it has operated in this mode for a sufficient duration, i.e. if elapsed time for period T2 has reached t2. Eventually, upon determining it has operated in this mode for the appropriate duration, the process continues at 820.

At 820, processor 502 causes signal up conversion section 105e to be coupled to transmit signal processing subsection 406a of signal processing section 400 (for the second protocol), at the exclusion of transmit signal processing subsection 406b (for the first protocol). At the same time, processor 502 causes receive signal processing blocks 404a and 404b to temporarily ignore or suspend processing signals output by down conversion sections 105c–105d. At 822, processor 502 repeatedly determines if it has operated in this mode for a sufficient duration, i.e. if elapsed time for period T3 has reached t3. Eventually, upon determining it has operated in this mode for the appropriate duration, the process continues at 824 and 826.

At 824 and 826 processor performs the same functions as earlier described for 816 and 818. Eventually, upon determining it has operated in this mode for period T4 for time t4, the process continues at 812.

Thus, a wireless device equipped to substantially operate currently with multiple wireless communication protocols has been described. While the present invention has been described in terms of the above illustrated embodiments, those skilled in the art will recognize that the invention is not limited to the embodiments described. The present invention can be practiced with modification and alteration within the spirit and scope of the appended claims. The description is thus to be regarded as illustrative instead of restrictive on the present invention.

What is claimed is:

1. An apparatus comprising:
a wireless transceiver having a joint signal transmit/receive section, and a plurality of signal up/down conversion sections sharing said joint signal transmit/receive section, to selectively transmit and receive signals in accordance with a first and a second protocol, in a coordinated manner, to and from network devices of a first and a second wireless network; and
a controller coupled to the wireless transceiver to control said wireless transceiver to perform said transmits and receives in said coordinated manner, wherein the controller, in a coordinated manner, selectively couples a first signal up conversion section to the joint signal transmit/receive section to perform said transmit of signals to network device(s) of said first wireless network, while keeping a second signal up conversion section decoupled from the joint signal transmit/receive section preventing signals from being transmitted to network device(s) of said second wireless network.

2. The apparatus of claim 1, wherein the controller further, in a coordinated manner, selectively couples a second signal up conversion section to the joint signal transmit/receive section to perform said transmit of signals to network device(s) of said second wireless network, while keeping the first signal up conversion section de-coupled from the joint signal transmit/receive section preventing signals from being transmitted to network device(s) of said first wireless network.

3. The apparatus of claim 1, wherein the controller, in a coordinated manner, selectively de-couples both a first and a second signal up conversion section from the joint signal transmit/receive section to prevent signals from being transmitted to network devices of said first and second networks.

4. The apparatus of claim 1, wherein the apparatus further comprises a signal processing section coupled to said wireless transceiver and said controller to process data for transmission by said wireless transceiver to said network devices of said wireless networks, and to process signals received by said wireless transceiver from said network devices of said wireless networks, in a coordinated manner, under the control of said controller.

5. The apparatus of claim 4, wherein the controller enables the signal processing section to simultaneously process signals received from network devices of said wireless networks, and down converted by signal down conversion sections of the wireless transceiver, and stops the signal processing section from processing signals output by said down conversion sections of the wireless transceiver.

6. The apparatus of claim 1, wherein the controller controls the wireless transceiver to perform said transmits and receives in a coordinated manner, in accordance with a time sharing schedule.

7. The apparatus of claim 6, wherein the controller comprises a processor adapted to control the wireless transceiver in a first transmit mode for the first protocol, a second transmit mode for the second protocol, and a joint receive mode for both protocols, in accordance with the time sharing schedule.

8. The apparatus of claim 7, wherein the processor is further adapted to adaptively manage the time sharing schedule.

9. The apparatus of claim 8, wherein the processor is further adapted to adaptively manage the time sharing schedule based at least in part on transmit or receive workloads of said first and second wireless networks.

10. The apparatus of claim 9, wherein the processor is further adapted to monitor and track transmit or receive workloads of said first and second wireless networks.

11. The apparatus of claim 1, wherein the first and second protocol are two protocols selected from a group consisting of Bluetooth, 802.11, 802.11a, 802.11b, and Home RF.

12. The apparatus of claim 1, wherein the joint signal transmit/receive section is a joint RF transmit/receive section, and the plurality of signal up/down conversion pairs are IF up/down conversion sections.

13. The apparatus of claim 1, wherein the controller further comprises a first and a second transmit signal processing section to processing transmit data for transmission in accordance with the first and second protocols, and the controller, in a coordinated manner, selectively couples a signal up conversion section to the first transmit signal processing section to perform said transmit of signals to network device(s) of said first wireless network, while keeping the second transmit signal processing section decoupled from the signal up conversion section, preventing signals from being transmitted to network device(s) of said second wireless network.

14. The apparatus of claim 13, wherein the controller further, in a coordinated manner, selectively couples the signal up conversion section to the second transmit signal processing section to perform said transmit of signals to network device(s) of said second wireless network, while keeping the signal up conversion section decoupled from the first transmit signal processing section, preventing signals from being transmitted to network device(s) of said first wireless network.

15. In an apparatus having a wireless transceiver including a joint signal transmit/receive section, and a plurality of signal up/down conversion sections sharing the joint signal transmit/receive section, a method of operation comprising:
(a) coupling a first signal up conversion section to the joint signal transmit/receive section to perform transmit of signals to network device(s) of a first wireless network in accordance with a first protocol, while keeping a second signal up conversion section decoupled from the joint signal transmit/receive section to prevent signals from being transmitted to network device(s) of a second wireless network in accordance with a second protocol; and
(b) coupling the second signal up conversion section to the joint signal transmit/receive section to perform transmit of signals to network device(s) of the second wireless network in accordance with the second protocol, while keeping the first signal up conversion section de-coupled from the joint signal transmit/receive section to prevent signals from being transmitted to network device(s) of the first wireless network in accordance with the first protocol.

16. The method of claim 15, wherein the apparatus further comprises:
a signal processing section coupled to said wireless transceiver to process data for transmission by said wireless transceiver to said network devices of said wireless networks, and to process signals received by said wireless transceiver from said network devices of said wireless networks, in a coordinated manner; and the method further comprises enabling the signal processing section to simultaneously process signals received from said network devices of said wireless networks, and down converted by signal down conversion sections of the wireless transceiver, and stops the signal processing section from processing signals output by said down conversion sections of the wireless transceiver.

17. The method of claim 15, wherein the method further comprises (c) adjusting performance repetition of (a) and (b).

18. The method of claim 17, wherein (c) is performed adaptively based at least in part on transmit or receive workloads of the first and second networks.

19. The method of claim 18, wherein the method further comprises (d) monitoring transmit or receive workloads of said first and second networks.

20. In an apparatus having a wireless transceiver including a plurality of signal up/down conversion sections, and a controlling section having a first and a second transmit signal processing section, a method of operation comprising:

(a) coupling a signal up conversion section to a first transmit signal processing section to perform transmit of signals to network device(s) of a first wireless network in accordance with a first protocol, while keeping the signal up conversion section de-coupled from a second transmit signal processing section to prevent signals from being transmitted to network device(s) of a second wireless network in accordance with a second protocol; and (b) coupling the signal up conversion section to the second transmit signal processing section to perform transmit of signals to network device(s) of the second wireless network in accordance with the second protocol, while keeping the signal up conversion section de-coupled from the first transmit signal processing section to prevent signals from being transmitted to network device(s) of the first wireless network in accordance with the first protocol.

* * * * *